W. V. TURNER.
SWAB PROTECTOR AND NUT LOCK.
APPLICATION FILED JUNE 29, 1917.
1,307,166.
Patented June 17, 1919.
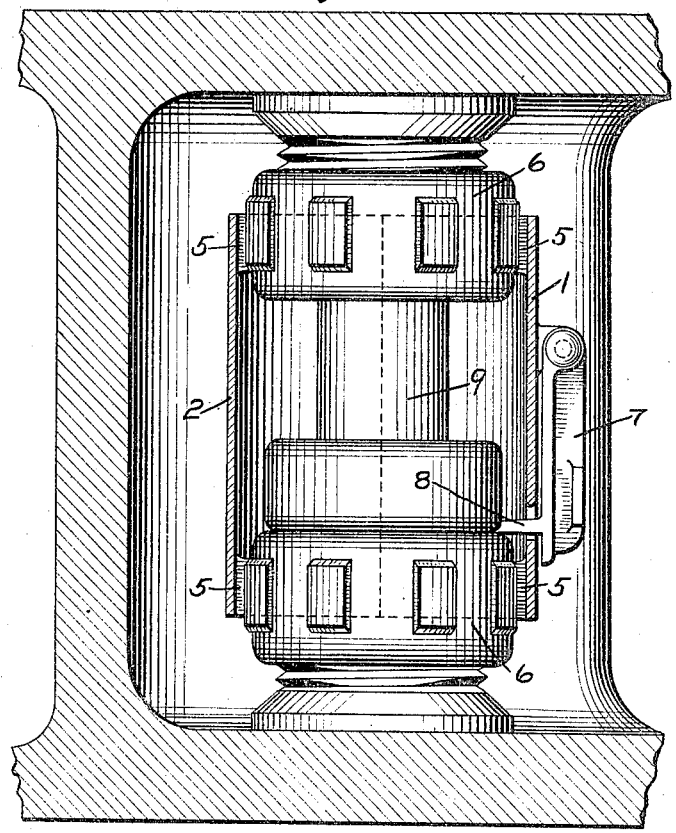
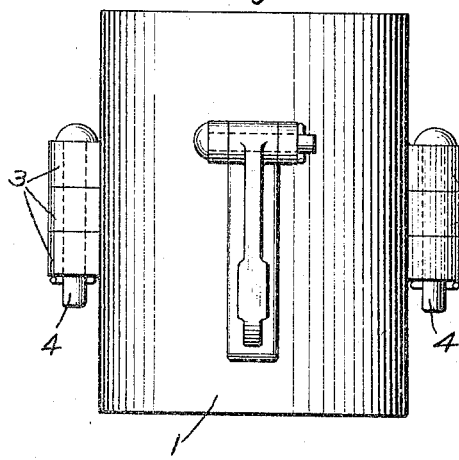
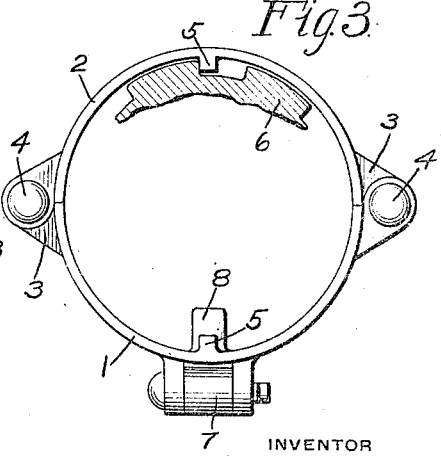
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SWAB-PROTECTOR AND NUT-LOCK.

1,307,166.                Specification of Letters Patent.        Patented June 17, 1919.

Application filed June 29, 1917. Serial No. 177,764.

*To all whom it may concern:*

Be it known that I, WALTER V. TURNER, a citizen of the United States, residing at Wilkinsburg, in the county of Allegheny and State of Pennsylvania, have invented new and useful Improvements in Swab-Protectors and Nut-Locks, of which the following is a specification.

This invention relates to combined nut locks and swab protectors and more particularly to a construction of this character adapted for use on locomotive steam pumps.

The principal object of my invention is to provide an improved nut lock and swab protector which cannot be readily removed, so as to reduce the possibility of removing same and thus prevent its being mislaid or lost.

In the accompanying drawing; Figure 1 is a section of the central portion of a locomotive steam pump, showing in section the improved nut lock and swab protector applied; Fig. 2 a front elevation of the swab protector; and Fig. 3 a plan view thereof.

As shown in the drawing, the construction may comprise front and rear semi-cylindrical segments 1 and 2 provided with ears 3 for hinge pins 4.

Within the segments are ribs 5 adapted to engage the spanner wrench slots of the usual stuffing box nuts 6.

In order to maintain the protector in position vertically, a member 7 is pivoted to the segment 1, and has a finger 8 adapted to extend through a slot in the segment 1, so as to engage the top portion of the lower stuffing box nut 6.

When it is desired to apply the device, one of the pins 4 is removed and the segments are swung open on the other pin 4. The protector is then placed in position around the piston rod 9 of the pump; so that the segment 2 is at the rear, as shown in Fig. 1 of the drawing. The segment being then closed in, the pin 4 is replaced to lock the segments together.

When in position, the finger 8 rests on the top of the nut 6, so as to hold the protector in position vertically.

If the lower stuffing box packing is to be changed, the protector may be lifted the necessary distance to permit the necessary manipulation, without removing the same, and if the upper stuffing box packing is to be changed, the member 7 is pulled outwardly, so as to permit the segments to drop down and thus expose the upper stuffing box nut 6.

Having now described my invention, what I claim as new and desire to secure by Letters Patent, is:

The combination with a pump stuffing box nut, of a swab protector comprising semi-cylindrical segments and an arm pivoted to one segment and adapted to engage said nut for maintaining the protector in position vertically.

In testimony whereof I have hereunto set my hand.

WALTER V. TURNER.